Patented July 28, 1942

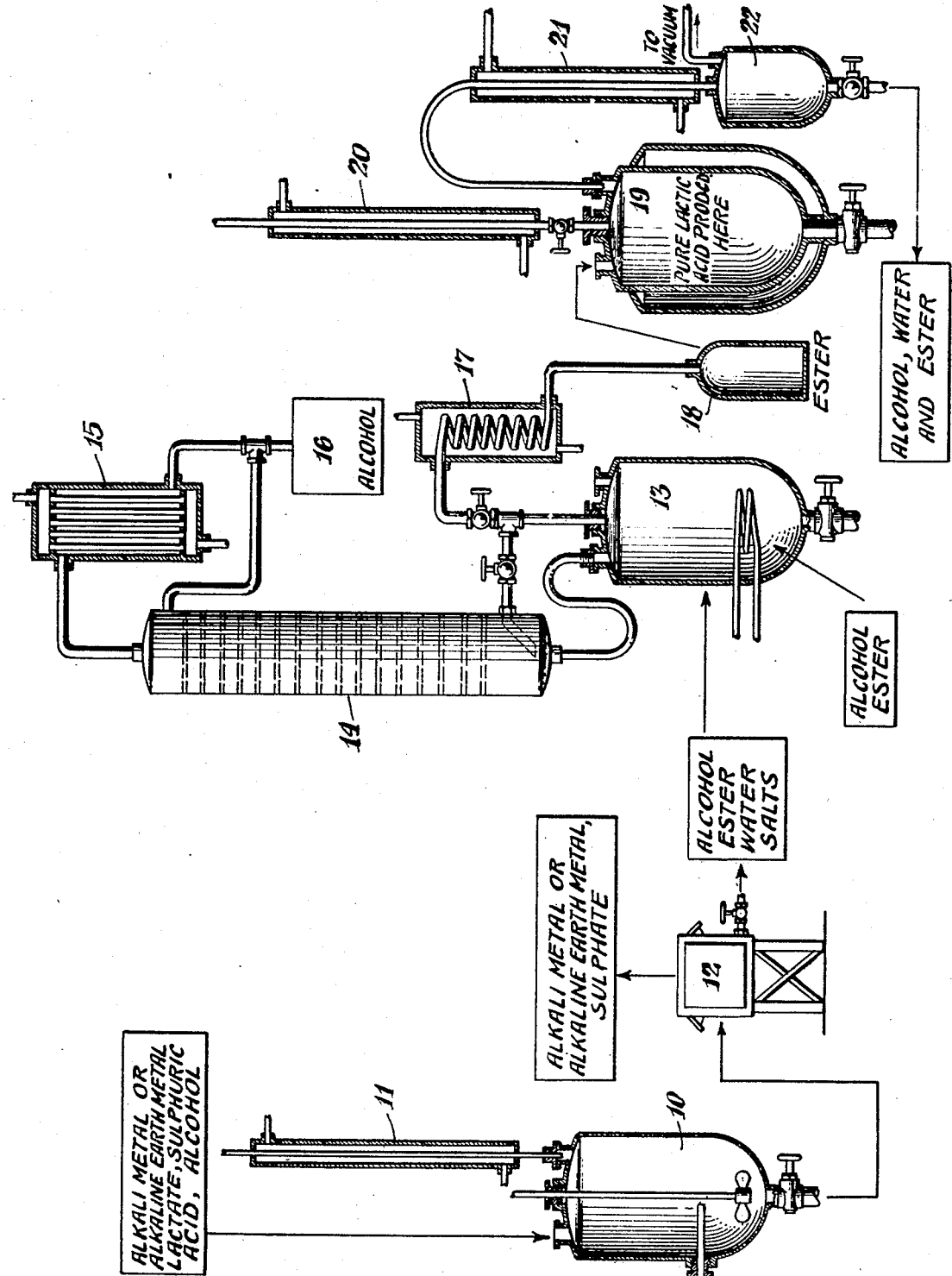

2,290,926

UNITED STATES PATENT OFFICE 2,290,926

PREPARATION OF LACTIC ACID

Samuel M. Weisberg and Edwin G. Stimpson, Baltimore, Md., assignors to Sealtest, Inc., Baltimore, Md., a corporation of Maryland Application December 5, 1939, Serial No. 307,605

12 Claims. (Cl. 260—484)

This invention relates to methods of preparing pure lactic acid and embodies, more specifically, an improved method of preparing pure lactic acid.

It has been suggested, heretofore, that lactic acid may be derived from alkaline earth metal lactates, such as, for example, calcium lactate, by esterifying the lactate with ethyl alcohol in the presence of sulfuric acid, separating the ester from the calcium sulfate sludge by filtration, and thereafter hydrolyzing the ester to recover lactic acid and ethyl alcohol.

Theoretically, this process appears to be highly satisfactory, but as a practical matter, it has been found to result in yields far less than theoretical and to require such extended treatment of the materials that the cost of the recovered lactic acid is excessive. Considerable loss is caused by the fact that the ester cannot be completely separated from the calcium sulfate sludge which is formed by reaction between sulphuric acid and the calcium lactate. About 10% of the ester is occluded in the sludge and constitutes about 30% to 40% of the sludge. Unless most of the occluded ester is recovered, the process is not commercially practical. Moreover, the recovered ester can be hydrolyzed completely only by extended heating of the ester and the use of a large volume of steam, thus even further increasing the cost of the lactic acid.

The present invention overcomes the disadvantages of producing lactic acid by esterification and hydrolysis, by providing an effective method for separating the ester from the sludge and by decreasing the time required to hydrolyze the ester completely into alcohol and lactic acid.

An object of the invention, accordingly, is to provide an improved method of preparing pure lactic acid by means of which increased yields may be obtained.

A further object of the invention is to provide a method of the above character by means of which lactic acid is recovered more economically.

Another object of the invention is to provide an improved method of separating more completely an ester from the residues produced by an esterification reaction.

An additional object of the invention is to provide an improved method of hydrolyzing the lactic acid esters whereby the recovery of the lactic acid is rendered more economical.

Our improvements in methods of preparing lactic acid are based on the discoveries that esters of lactic acid and the lower alcohols, such as, for example, methyl, ethyl, isopropyl, and butyl lactates form constant boiling solutions with water and that hydrolysis of such esters is expedited by the presence of lactic acid and pressures in excess of atmospheric.

Thus, in accordance with the present invention, free lactic acid ester may be distilled to separate it from the residue of salts formed during the esterification reaction. Thereafter, the occluded and included ester in the residue is converted into a constant boiling mixture by the addition of water to the residue and is recovered by distillation. The ester, which otherwise would be lost in the residue, is thereby recovered, greatly increasing the ester yield.

The ester is then hydrolyzed by heating, either at atmospheric pressure in the presence of lactic acid or in an autoclave at pressures in excess of atmospheric, either with or without lactic acid. Under any of these conditions, the time required to hydrolyze the ester completely is greatly decreased. Therefore, by practicing the process embodying the present invention, the cost of producing the lactic acid is greatly reduced and the recovery of lactic acid is facilitated.

For a better understanding of the invention, reference may be had to the accompanying drawing in which the single figure illustrates diagrammatically a typical form of device used in practicing the process.

This device may consist of a suitable esterification kettle 10 provided with a refluxing column 11; a filter press 12; a still 13 having a fractionating column 14 and a condenser 15 connected in series with a receptacle 16, and a condenser 17 connected to a receiving tank 18; and a hydrolyzing kettle or still pot 19 provided with a refluxing column 20 and a condenser 21 connected to a storage tank 22.

In practice, the esterification kettle 10 is charged with an alkali metal or alkaline earth metal lactate, such as, for example, sodium, potassium, calcium or magnesium lactate, preferably sodium lactate. An alcohol such as for example, methyl, ethyl, propyl or butyl alcohol, is added to the lactate in excess of the theoretical combining proportion. An excess of the alcohol increases the rate of reaction and assures complete esterification of the lactate with the alcohol. To the mixture in the kettle 10 is added sulfuric acid in excess of the quantity required to liberate the lactic acid and the mixture is then heated. The excess sulfuric acid acts as a catalyst and increases the rate of reaction.

The temperature of the mixture in the kettle 10 is sufficiently high that refluxing in the column 11 is maintained. Heating in the kettle is continued until the esterification reaction between the alcohol and the lactic acid is completed. The period of reaction will vary depending upon the concentration of the lactate and the amount of sulfuric acid that is present and upon the ratio of alcohol to lactate salt.

At the end of the esterification reaction, we prefer to neutralize the mixture in the kettle 10 with sodium carbonate although this not essential to the process. The best results are obtained by regulating the pH value of the mixture to about 7.5. Sodium carbonate is more satisfactory than other alkalis or alkaline agents, such as, for example, sodium hydroxide, for the reason that sodium carbonate does not tend to hydrolyze the ester into lactic acid and alcohol.

The neutralizing agent, for example, sodium carbonate or sodium hydroxide, can be dissolved or dispersed in methanol instead of water. This solution can be used to neutralize the reaction mixture without introducing additional water into the reaction mixture, thus maintaining a high concentration of the ester in the mixture and reducing the quantity of water that must be removed to produce concentrated lactic acid at a later stage of the process.

During esterification, sodium sulfate is formed and inasmuch as this compound has a tendency to adsorb the ester and to interfere with subsequent treatments, the portion that has crystalized preferably is removed by filtration in the filter press 12.

The filtrate which contains free alcohol, water, the ester and dissolved salts, such as, for example, sodium sulfate, is passed into the still 13 where the free alcohol is substantially completely removed by fractionation in the column 14 and the condenser 15. The alcohol is recovered as about a 98% solution in the receptacle 16 and may be re-used.

When using methyl alcohol in conjunction with the alkali or alkaline earth metal lactate, it has been found that substantially all of the alcohol is removed when the temperature in the still 13 rises to about 203° F.. At this time the fractionating column is disconnected from the still 13 and the vapors are directed into the condenser 17 where they are condensed. The ester is collected in the reservoir 18. This distilling step is preferably conducted under a vacuum in order to avoid hydrolyzing the ester. Distillation is continued until boiling in the still has substantially ceased. Inasmuch as the volume of the liquid in the still has been materially reduced, a precipitate or residue will have formed in the still. This residue consists of sodium sulfate and the ester; about 10% of the total amount of ester is occluded in the residue and forms 30% to 40% of the residue.

In order to separate the ester from the residue, heating in the still 13 is continued and water is added at a constant but slow rate to the mixture in the still. The added water combines with the ester in the sludge or residue to form a constant boiling solution containing about 30% to 35% of ester and having a boiling point between 208° to 212° F. Preferably this dilute solution is collected separately from the stronger solution which is distilled over initially, thus facilitating concentration of the lactic acid produced by hydrolyzing the more concentrated solution of the ester, and allowing smaller quantities to be treated. This latter distillation is continued until the constant boiling solution of ester and water is substantially completely separated from the residue. The solutions of ester are then blended to produce the desired ester concentration and delivered to the hydrolyzing kettle 19 where the ester is hydrolyzed into alcohol and lactic acid by heating. In accordance with prior practice the ester is hydrolyzed by heating at atmospheric pressure in order to split it into alcohol and lactic acid. Four to seven and one-half hours ordinarily are required to hydrolyze the ester to a maximum degree.

In accordance with the present invention, hydrolysis can be greatly expedited by the addition of lactic acid to the ester and heating at atmospheric pressure with the refluxing in the column 20. It has been found that about 15% of lactic acid by volume is sufficient to reduce the time required for hydrolysis at atmospheric pressure to about two hours. The amount of added lactic acid used may be less or more than indicated above and comparable results are obtained.

An alternative method of hydrolyzing the ester includes heating it at superatmospheric pressure in the kettle 19, either with or without the addition of lactic acid. Thus, in typical tests, not involving the use of lactic acid, the time required for hydrolysis at atmospheric pressure and a temperature of 212° F., was 7½ hours. At 15 pounds gage pressure and a temperature of 250° F., 3 hours were required to complete the hydrolysis. At 30 pounds gage pressure and a temperature of 274° F., one hour was required to complete the hydrolysis of the ester. At 60 pounds pressure and 308° F., the time required to hydrolyze the ester completely was 20 minutes. At 100 pounds pressure, the time was 10 minutes. The above times were based on the hydrolysis of a 50 to 58% aqueous methyl lactate solution. Lower concentrations of the ester are hydrolyzed even more rapidly.

Maximum yields of acid may be obtained by autoclaving aqueous solutions containing 40 to 75% of the ester at between about 15 and 100 pounds gage pressure. It is very advantageous to use 40 to 75% solutions because this eliminates the necessity of removing excessive quantities of water from the acid to concentrate it.

The addition of lactic acid to the ester and the use of high pressures likewise expedites the hydrolysis of the ester, and as a consequence, maximum yields with a minimum of time for hydrolysis can be obtained by using this combination.

After hydrolysis in the kettle 19 is completed, the free alcohol, water and some ester, which has not been hydrolyzed, are separated from the lactic acid by distilling these substances under vacuum and condensing them in the condenser 21. This mixture is not wasted, but instead may be returned to the still 13, mixed with a fresh charge from the kettle 10 and re-treated, thus recovering a considerable amount of lactic acid which otherwise would be lost.

The lactic acid remaining in the hydrolyzing kettle 19 may be removed and subjected to further treatments, such as, for example, decolorizing or concentrating treatments as may be desired.

A typical example of the process with particular reference to recoveries of the products at various stages of the process is as follows:

35 pounds of 90% sodium lactate, 18.8 gallons of methyl alcohol and 16 pounds of technical sulfuric acid are heated in the kettle 10 to produce methyl lactate. There is present 10% more of sulfuric acid than is required to free the lactic acid from the sodium lactate.

At the end of the esterification reaction, the mixture in the kettle 10 is substantially neutralized preferably with two pounds of sodium carbonate dissolved in methanol and the solution is filtered to remove the solids. The equivalent amount of sodium hydroxide dissolved in methanol or sodium carbonate dissolved in water may be used to neutralize the solution. 26 pounds of methyl lactate, 17.6 gallons of methanol of which 5 to 10 pounds is in the filter cake, 8.5 pounds of water, 22 pounds of sodium sulfate are produced by the esterifying and neutralizing reactions.

The filtrate is fractionated in the fractionating column 14 and approximately 16.3 gallons of 98% methanol are recovered.

The residue is distilled to separate the methyl lactate and some water from the sodium sulfate residue. 10.5 pounds of water is then added to remove the residual methyl lactate as the constant boiling solution and the distillate is hydrolyzed. Hydrolysis of the 26 pounds of methyl lactate with a total of 19 pounds of water, which represents the water initially present plus that required to form the constant boiling solution, results in the production of 13 pounds of lactic acid. 11 pounds of methyl lactate, 16.4 pounds of water and 4.65 pounds of methanol are separated from the lactic acid by vacuum distillation and this distillate is returned to the still 13 for further treatment. A continuous run results in the recovery of about 91% of theoretical quantity of the lactic acid. This recovery is far superior to those of prior processes and as a result renders our process commercially practical from a production standpoint.

It will be readily understood that the process described above affords a great saving in time, labor and steam and results in increased recoveries of lactic acid from the starting stock, thereby greatly reducing the cost of production of the purified lactic acid.

It should be understood that the process and apparatus described above are illustrative and that there may be variations in the procedural steps and in the apparatus used without departing from the invention. Therefore, the process and apparatus described above should not be considered as limiting the scope of the following claims.

We claim:

1. The process of preparing lactic acid comprising liberating lactic acid from a salt of lactic acid, reacting said acid with a lower alcohol to form an ester and a residue containing a portion of said ester, distilling off the ester not contained in said residue, adding water to said residue to form a constant boiling solution of ester and water, distilling the ester contained in said residue and hydrolyzing said ester to convert it into said alcohol and lactic acid.

2. A process of preparing lactic acid comprising liberating lactic acid from a salt of lactic acid, reacting said acid with a lower alcohol in the presence of an acid to form an ester and a residue containing a portion of said ester, distilling said ester, adding water to said residue to form a constant boiling solution containing 30 to 35% of said ester, distilling said constant boiling solution, collecting the distillate, and hydrolyzing said distillate to convert it into said alcohol and lactic acid.

3. The process of preparing lactic acid comprising liberating lactic acid from a salt of lactic acid, reacting said acid with an excess of a lower alcohol in an acid solution to form an ester, substantially neutralizing said solution, filtering said solution to separate a filtrate from a solid residue of the esterification reacton, fractionating said filtrate to recover the excess alcohol, distilling the ester to purify and separate it from residual solids, adding water to said residual solids to form a constant boiling solution, distilling said solution, collecting the distillate, and hydrolyzing said distillate to convert it into lactic acid and said alcohol.

4. The process of preparing lactic acid comprising liberating lactic acid from a salt of lactic acid, reacting said acid with a lower alcohol to form an ester and a residue containing a portion of said ester, distilling off the ester not contained in said residue, adding water to said residue to form a constant boiling solution of ester and water, distilling the constant boiling solution, blending the ester distillates to form a solution of the ester of a desired concentration and hydrolyzing the last-mentioned solution to convert it into said alcohol and lactic acid.

5. A process of preparing esters of lactic acid comprising heating a salt of lactic acid with a lower alcohol in the presence of an excess of an acid to form an ester and a residue, a portion of said ester being occluded in and forming a portion of said residue, distilling off the free ester, adding water to said residue to form a constant boiling solution of water and the ester in the residue, and distilling off said constant boiling solution.

6. A process of preparing esters of lactic acid comprising heating sodium lactate with methyl alcohol in the presence of an excess of an acid to form methyl lactate and a residue, a portion of said methyl lactate being occluded in and forming a portion of said residue, distilling off the free methyl lactate, adding water to said residue to form a constant boiling solution of water and the methyl lactate in the residue, and distilling off said constant boiling solution.

7. A process of preparing esters of lactic acid comprising heating a salt of lactic acid with a lower alcohol in the presence of a strong acid to form a solution containing an ester, free alcohol, acid and a salt of said strong acid, mixing an alkali with said solution to render it slightly alkaline, filtering said solution to separate out solid material, fractionating said solution to separate the free alcohol, distilling the residue to purify the free ester, adding water to a residue from the last-mentioned distillation to form a constant boiling solution of ester occluded in said residue, and distilling said constant boiling solution.

8. A process of preparing esters of lactic acid comprising liberating lactic acid from a salt of lactic acid, reacting said acid with a lower alcohol to form an ester and a residue, a portion of said ester being occluded in and forming a portion of said residue, adding water to said residue, and separating the ester from said residue by distilling off the ester as a constant boiling solution.

9. The process set forth in claim 8, in which the salt of lactic acid is at least one of the group consisting of alkali metal and alkaline earth metal lactates and the lower alcohol is at least one of the group consisting of methyl, ethyl, propyl and butyl alcohols.

10. A process of hydrolyzing an ester of lactic acid to recover lactic acid therefrom, comprising adding lactic acid to a solution of an ester of lactic acid in an amount sufficient to materially decrease the time required to hydrolyze said ester and in an amount insufficient to prevent hydrolysis from taking place, heating said solution of said ester until equilibrium is substantially attained, and distilling off the alcohol liberated by hydrolysis.

11. A process of hydrolyzing an ester of lactic acid to recover lactic acid therefrom, comprising adding about 15% of lactic acid to an aqueous solution of an ester of lactic acid, heating said solution of said ester until equilibrium is substantially attained, and distilling off the alcohol liberated by hydrolysis.

12. A process of hydrolyzing an ester of lactic acid to recover lactic acid therefrom, comprising adding lactic acid to an aqueous solution of an ester of lactic acid in an amount sufficient to materially decrease the time required to hydrolyze said ester and in an amount insufficient to prevent hydrolysis from taking place, heating said solution of said ester at a pressure between about 15 and 100 pounds gauge pressure until equilibrium is substantially attained, and distilling off the alcohol liberated by hydrolysis.

SAMUEL M. WEISBERG.
EDWIN G. STIMPSON.

CERTIFICATE OF CORRECTION.

Patent No. 2,290,926. July 28, 1942.

SAMUEL M. WEISBERG, ET AL.

It is hereby certified that error appears in the printed specification of the above numbered patent requiring correction as follows: Page 2, first column, line 47, for "2030°" read --203°--; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.